United States Patent
Shih et al.

(10) Patent No.: US 8,612,783 B2
(45) Date of Patent: Dec. 17, 2013

(54) REMOTE CONTROLLED COMPUTER SYSTEM THAT AVOIDS ACCIDENTAL POWER CYCLING BY SELECTIVELY TRANSMITTING A MANUAL TRIGGER SIGNAL TO A MOTHERBOARD BASED ON THE PRESENCE OF A POWER ACTIVATING SIGNAL FROM A CONNECTED POWER SUPPLY

(75) Inventors: Tsun-Te Shih, Taipei Hsien (TW); Yu-Yuan Chang, Taipei Hsien (TW); Chia-Lun Liu, Taipei Hsien (TW); Kuang-Lung Shih, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 340 days.

(21) Appl. No.: 12/984,786

(22) Filed: Jan. 5, 2011

(65) Prior Publication Data
US 2012/0173898 A1 Jul. 5, 2012

(51) Int. Cl.
*G06F 1/00* (2006.01)
*G06F 11/30* (2006.01)

(52) U.S. Cl.
USPC ........................................ 713/310; 713/340

(58) Field of Classification Search
USPC .................................................. 713/310, 340
See application file for complete search history.

(56) References Cited

U.S. PATENT DOCUMENTS

| | | | | |
|---|---|---|---|---|
| 5,764,547 A | * | 6/1998 | Bilich et al. | 713/321 |
| 6,125,449 A | * | 9/2000 | Taylor et al. | 713/310 |
| 2005/0251697 A1 | * | 11/2005 | Narukawa et al. | 713/310 |
| 2012/0173898 A1 | * | 7/2012 | Shih et al. | 713/310 |

FOREIGN PATENT DOCUMENTS

TW  I262672  9/2006

* cited by examiner

*Primary Examiner* — Thomas Lee
*Assistant Examiner* — Terrell Johnson
(74) *Attorney, Agent, or Firm* — Muncy, Geissler, Olds & Lowe, PLLC

(57) ABSTRACT

A remote-controlled computer system includes a computer system electrically linked to a remote control device. The remote control device receives a manual operation to generate a manual trigger signal sent to the computer system. The computer system includes a motherboard, a power supply and a status control unit. The motherboard receives continuously the manual trigger signal and sends a power ON/OFF signal to start or stop the power supply. The power supply provides electric power to the motherboard for booting and a power activating signal to the motherboard. The status control unit is electrically connected to the motherboard, power supply and remote control device. The status control unit receives the manual trigger signal from the remote control device and transmits to the motherboard. The status control unit also detects absence of the power activating signal output from the power supply and stops sending the manual trigger signal.

8 Claims, 2 Drawing Sheets

REMOTE CONTROLLED COMPUTER SYSTEM THAT AVOIDS ACCIDENTAL POWER CYCLING BY SELECTIVELY TRANSMITTING A MANUAL TRIGGER SIGNAL TO A MOTHERBOARD BASED ON THE PRESENCE OF A POWER ACTIVATING SIGNAL FROM A CONNECTED POWER SUPPLY

FIELD OF THE INVENTION

The present invention relates to a remote-controlled computer system and particularly to a system monitored by a status monitor unit according to the status of a power supply to confirm whether a computer has been shut down.

BACKGROUND OF THE INVENTION

A computer system that can be shut down through software and a manual switch is very popular at present. In addition to an operating system to execute related shutdown function, the computer system also has a manual power button. When the power button is pressed by a user, a manual trigger signal is generated. The manual trigger signal is sent to a motherboard of the computer system. To avoid the computer being shut down due to inadvertent press of the power button by the user, the motherboard is set to execute the shutdown operation until several seconds have elapsed after receiving the manual trigger signal. Either software shutdown or manual shutdown can be executed through a remote control device.

In the known techniques at present, to turn on the computer system remotely is accomplished through software or BIOS. For instance, R.O.C. patent No. I262672 entitled "Method for remotely turning on a computer through wake-on-LAN" at least discloses a motherboard supporting wake-on-LAN and a network card also supporting wake-on-LAN to execute remote booting in the background of this prior art. The network card and motherboard have respectively a connection port connected through a cable. Through the cable, the network card still can obtain a small amount of electric current from the power supply of the computer to monitor network frame even the computer is in a shutdown state. The network card supporting wake-on-LAN continuously monitors whether the local area network connected thereto has a packet with a special format (called Magic Packet) in the shutdown state. The Magic Packet is packaged in a frame format at the second layer in the network as shown in its FIG. 1a. In the event that the network card discovers a special segment that contains "FF" (16 carry digits) of six successive bytes and the following MAC address repeated sixteen times of the network card in anywhere of the Magic packet, the network card activates the computer to turn on through the cable linked to the motherboard. Based on the aforesaid conventional technique, I262672 proposes a method including steps of: 1. providing an operation interface to be linked to an interface device through a processing device linked to a first network, through an application program installed in the processing device compatible with the operation interface, and through a suitable communication protocol via the first network; 2. receiving a MAC address designated by the user that corresponds to a computer to support wake-on-LAN function in a second local area network; and 3. preparing a Magic packet according to wake-on-LAN protocol and the MAC address and broadcasting the Magic packet to the second local area network. Hence this prior art executes booting (or shutdown) operation through "the application program installed in the processing device compatible with the operation interface".

A computer user can directly execute software shutdown function through the operating system. However, in the event that a serious software error takes place and results in crash, manual shutdown is needed. User has to directly press the power button of the computer continuously for a few seconds (depending on different designs of motherboards). The computer judges that the continuous press of the power button is intended by the user to shut down rather than an erroneous hit, and then executes a shutdown command. Moreover, after the computer system is shut down but the user still presses the power button continuously, the computer is triggered to start again after a few seconds lapsed.

Please refer to FIG. 1 for a computer system architecture now being commonly adopted. It includes a remote control device 1 electrically linked to a computer system 2 via a network. There is no restriction on network type and communication protocol. The computer system 2 includes a motherboard 21, a power supply 22, a processing system 23 and a network card 24. The processing system 23 is installed on the motherboard 21. The network card 24 receives signals transmitted from the remote control device 1 through the network, and sends the received signals to the motherboard 21. The motherboard 21 and power supply 22 are linked through a power line 220 and a signal line 221. The remote control device 1 sends a manual shutdown signal to command the computer system 2 to shut down due to the power button pressed by the user.

When the user directly operates the manual shutdown function by the side of the computer system 2, the user can directly judge whether the computer system 2 is shut down, and stop pressing the power button after shutdown. However, when the remote-controlled computer system 2 has to be shut down manually because of software malfunction, the user presses the power button but cannot directly judge whether the computer system 2 is shut down. The user can only roughly estimate the duration of pressing the power button to judge whether the computer system 2 has been shut down without definite confirmation. Pressing the power button too long could allow the shutdown computer system 2 to be restarted again. Hence the user encounters a dilemma of unable to directly confirm the status of the remote-controlled computer system 2.

SUMMARY OF THE INVENTION

In view of the conventional techniques in controlling ON and OFF of a remote-controlled computer system still focus on improvements in software and signal formats, they still leave a lot to be desired, and no software or BIOS can be used to shut down the computer when the computer system crashes and has to rely on manual shutdown; and during execution of remote manual shutdown, users cannot confirm whether the computer has exactly shut down and could cause restart of the computer; therefore, the object of the invention is to provide a remote-controlled computer system to allow remote users to clearly understand ON/OFF status of the computer.

The present invention provides a remote-controlled computer system that includes a computer system electrically linked to a remote control device. The remote control device receives a manual operation to generate a manual trigger signal sent to the computer system. The computer system includes a motherboard, a power supply and a status control unit. The motherboard receives continuously the manual trigger signal for a preset duration and then outputs a power ON/OFF signal to start or stop the power supply. When the power supply is started, electric power is provided to the motherboard to enter in an ON state and a power activating signal is sent to the motherboard. The status control unit is electrically connected to the motherboard, power supply and remote control device. The status control unit receives the manual trigger signal from the remote control device and transmits the manual trigger signal to the motherboard. The status control unit also detects absence of the power activating signal output from the power supply and stops outputting the manual trigger signal generated by the manual operation. Since the status control unit stops outputting the manual trigger signal after the power supply is OFF, hence even if the user executes the manual operation for a prolonged duration, the manual trigger signal does not last too long to cause repeat ON and OFF of the computer system. Through such a technique of the invention, the user can execute manual shutdown without worrying whether the remote computer is shutdown no matter what the setting of the motherboard is.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
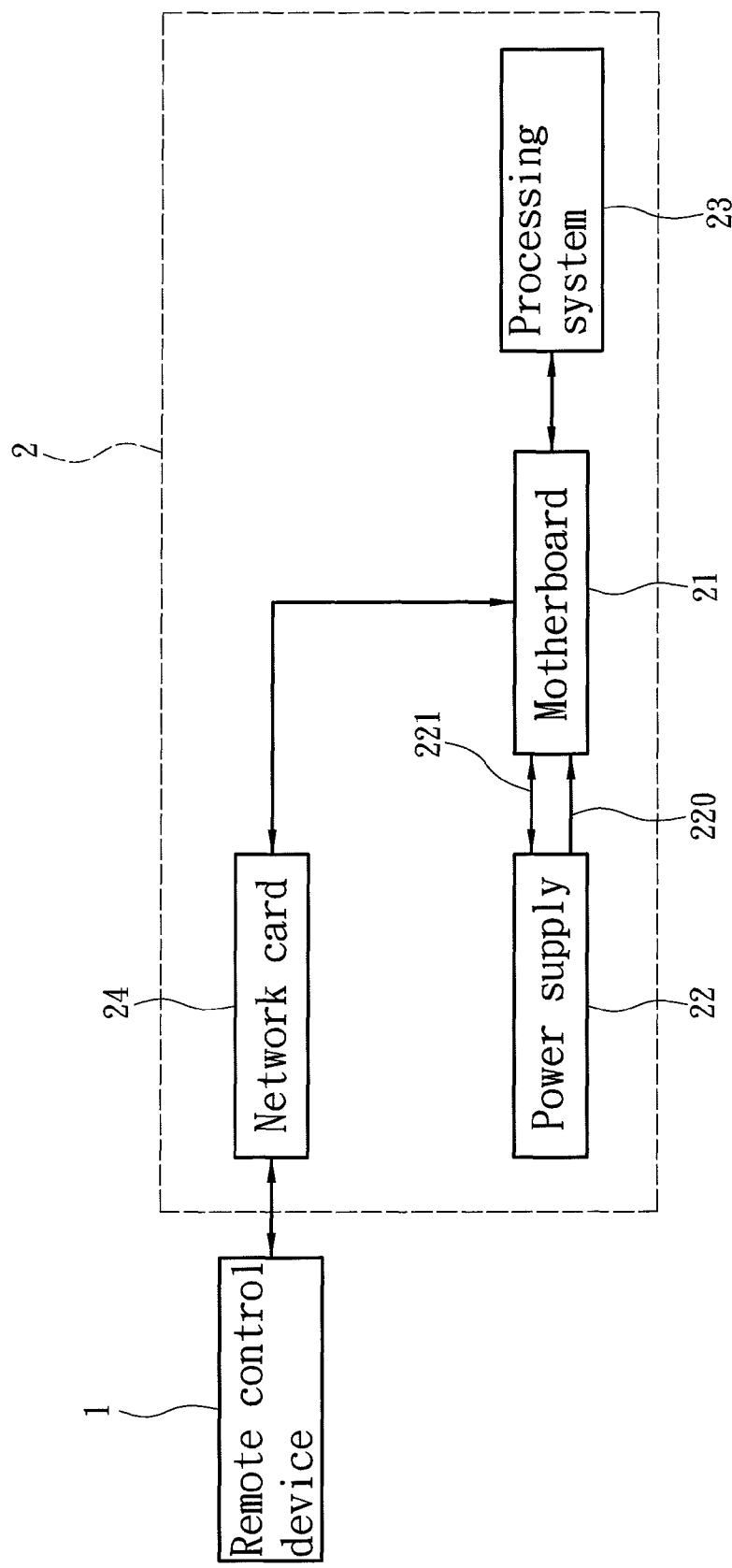
FIG. 1 is a circuit block diagram of a conventional technique.
Figure 2:
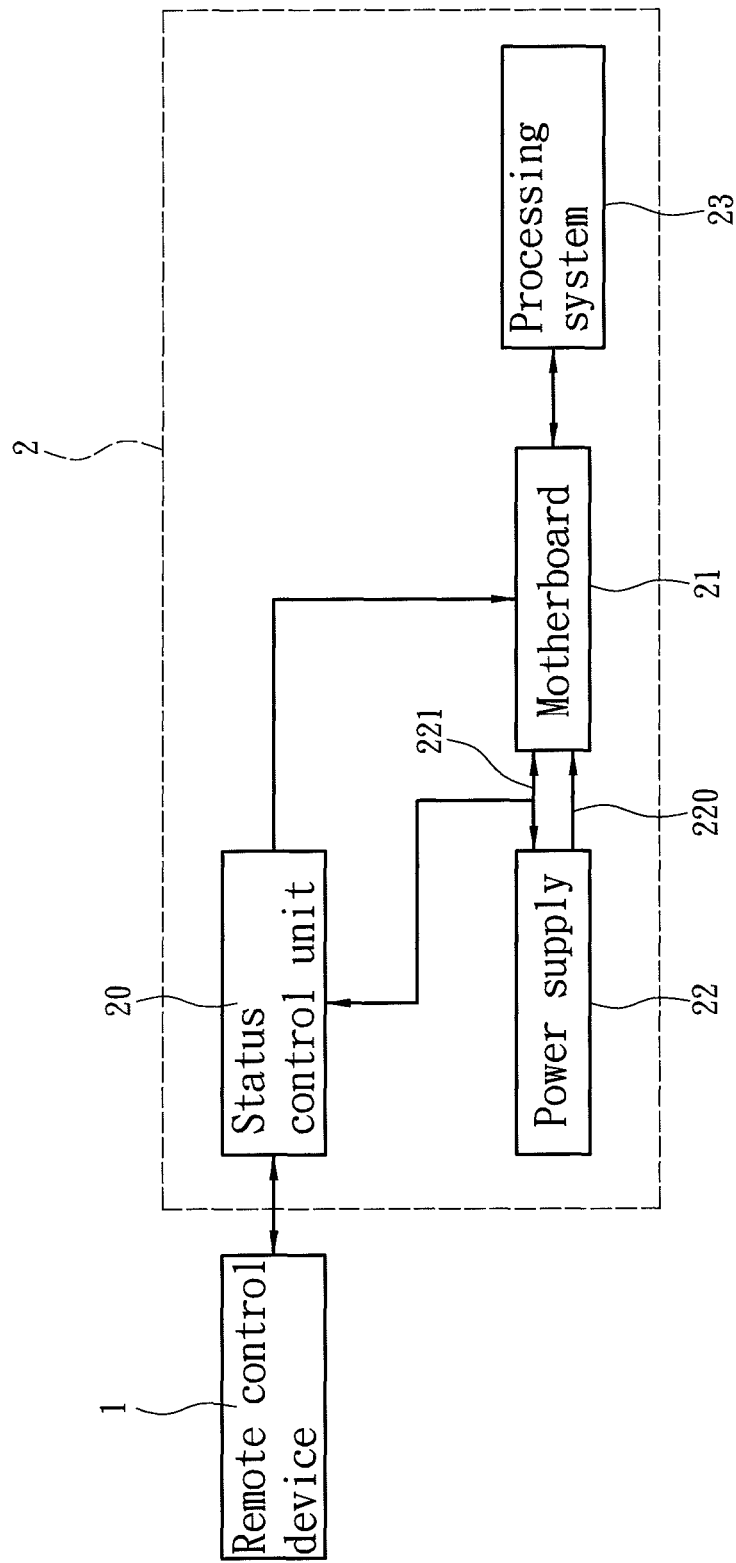
FIG. 2 is a circuit block diagram of the invention.

Please refer to FIG. 1, the present invention provides a remote-controlled computer system that includes a computer system 2 electrically connected to a remote control device 1 which can monitor or directly control operation of the computer system 2 in an ON state. The remote control device 1 and the computer system 2 are linked via a local area network or Internet. The adoptable network type and its variations of the remote control device 1 and the computer system 2 can be easily known by those skilled in the art, thus are not the main features of the invention, and shall be included within the scope of the invention. The computer system 2 includes a motherboard 21, a power supply 22, a status control unit 20 and a processing system 23 electrically connected to the motherboard 21. The motherboard 21 and power supply 22 are linked through a power line 220 and a signal line 221. The status control unit 20 is electrically connected to the motherboard 21, power supply 22 and remote control device 1. The remote control device 1 can output a booting signal to the status control unit 20 through a network, and then the status control unit 20 sends the booting signal to the motherboard 21. The motherboard 21 outputs a power ON/OFF signal through the signal line 221 to activate the power supply 22. After the power supply 22 is activated, it not only supplies operation power via the power line 220 to the motherboard 21 and processing system 23 for booting, but also sends a power activating signal (PS_ON) via the signal line 221 to the motherboard 21. In the general software shutdown process, the processing system 23 processes software to execute a software shutdown command to drive the motherboard 21 to output the power ON/OFF signal through the signal line 221 to shut down the power supply 22. When the power supply 22 is shut down, output of the power activating signal (PS_ON) also is stopped. The software shutdown is a technique known in the art, thus details are omitted herein. In the event that the computer system 2 crashes due to a serious error and software shutdown cannot be executed, the remote monitor device 1 receives a manual operation to generate a manual trigger signal sent to the computer system 2. To facilitate manual operation, the remote monitor device 1 provides a manual switch device operated by a user to generate continuously the manual trigger signal until the manual switch device is released by the user. The manual switch device can be a pushbutton. Hence the user can continuously press the pushbutton to generate continuously the manual trigger signal sent to the status control unit 20. Once the manual switch device is released by the user, generation of the manual trigger signal is stopped. The status control unit 20 receives the manual trigger signal from the remote monitor device 1 and transmits the manual trigger signal to the motherboard 21. The motherboard 21 continuously receives the manual trigger signal for a preset duration, and then outputs the power ON/OFF signal to the power supply 22 through the signal line 221. The power supply 22 receives the power ON/OFF signal and is shut down. The motherboard 21 and processing system 23 also are shut down at the same time. The motherboard 21 outputs the power ON/OFF signal only after having continuously received the manual trigger signal for a preset duration. The preset duration varies depending on different types of the motherboard 21 (set by manufacturers while producing). To avoid the trouble of executing manual shutdown, the status control unit 20 monitors whether the power supply 22 has output the power activating signal through a communication network linked electrically to the power supply 22. The communication network can be $I^2C$, SPI, PM Bus or TCP/IP. When the status control unit 20 detects absence of the power activating signal output from the power supply 22, it stops outputting the manual trigger signal generated by the manual operation. Hence only if the status control unit 20 confirms that output of the power activating signal is stopped by the power supply 22, the manual trigger signal generated by the manual operation is not sent to the motherboard 21 anymore even the user still continuously generates the manual trigger signal through the manual switch device (such as the pushbutton). No matter which type of the motherboard is or how long the user manually operates, the motherboard 21 is not repeatedly restarted or shut down due to prolonged manual operation of the user.

The status control unit 20 previously discussed can be a circuit board with a control circuit independent of the motherboard 21, and installed on the power supply 22 or a casing of the computer system 2.

While the invention has been described by means of a specific embodiment, numerous modifications and variations could be made thereto by those skilled in the art without departing from the scope and spirit of the invention set forth in the claims.

In summation of the above description, the present invention provides a significant improvement over the conventional techniques and complies with the patent application requirements, and is submitted for review and granting of the commensurate patent rights.

What is claimed is:

1. A remote-controlled computer system including a computer system electrically connected to a remote control device which receives a manual operation to generate a manual trigger signal sent to the computer system, comprising:

a motherboard continuously receiving the manual trigger signal for a preset duration and then outputting a power ON/OFF signal;

a power supply which is set ON or OFF upon being triggered by the power ON/OFF signal providing electric power to the motherboard for booting and a power activating signal to the motherboard; and a status control unit electrically connected to the motherboard, the power supply and the remote control device to receive the manual trigger signal from the remote control device and transmit the manual trigger signal to the motherboard, and detect absence of the power activating signal output from the power supply to stop outputting the manual trigger signal generated by the manual operation.

2. The remote-controlled computer system of claim 1, wherein the computer system further includes a processing system electrically connected to the motherboard that includes software to execute a software shutdown command to drive the motherboard to output the power ON/OFF signal to shut down the power supply.

3. The remote-controlled computer system of claim 1, wherein the remote control device includes a manual switch device operated by a user to continuously generate the manual trigger signal until being released by the user to stop generation of the manual trigger signal.

4. The remote-controlled computer system of claim 1, wherein the status control unit monitors whether the power supply outputs the power activating signal through a communication network electrically linked to the power supply.

5. The remote-controlled computer system of claim 4, wherein the communication network is selected from the group consisting of I$^2$C, SPI, PM Bus and TCP/IP.

6. The remote-controlled computer system of claim 1, wherein the status control unit is a circuit board with a control circuit independent of the motherboard.

7. The remote-controlled computer system of claim 6, wherein the status control unit is installed on the power supply.

8. The remote-controlled computer system of claim 6, wherein the status control unit is installed on a casing of the computer system.

* * * * *